United States Patent
Sung

(10) Patent No.: US 8,633,759 B2
(45) Date of Patent: Jan. 21, 2014

(54) VOLTAGE GENERATOR AND METHOD OF GENERATING VOLTAGE

(75) Inventor: Moon Soo Sung, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 13/450,899

(22) Filed: Apr. 19, 2012

(65) Prior Publication Data

US 2012/0268179 A1 Oct. 25, 2012

(30) Foreign Application Priority Data

Apr. 21, 2011 (KR) .......................... 10-2011-0037166

(51) Int. Cl.
*G05F 1/10* (2006.01)
*G05F 3/02* (2006.01)

(52) U.S. Cl.
USPC .......................................................... 327/536

(58) Field of Classification Search
USPC ........................................ 327/536; 363/59–60
See application file for complete search history.

(56) References Cited

U.S. PATENT DOCUMENTS

| | | | | |
|---|---|---|---|---|
| 6,894,554 | B2 * | 5/2005 | Ito | 327/536 |
| 8,067,978 | B2 * | 11/2011 | Jurasek | 327/536 |
| 8,111,107 | B2 * | 2/2012 | Huang | 331/17 |
| 2007/0139099 | A1 * | 6/2007 | Pan | 327/536 |

FOREIGN PATENT DOCUMENTS

| | | |
|---|---|---|
| KR | 1020060030652 A | 4/2006 |
| KR | 1020090034559 A | 4/2009 |
| KR | 10-0965082 B1 | 6/2010 |

* cited by examiner

*Primary Examiner* — Quan Tra
(74) *Attorney, Agent, or Firm* — William Park & Associates Patent Ltd.

(57) ABSTRACT

A voltage generator includes a clock generator configured to generate a first clock signal and a second clock signal having a longer cycle than the first clock signal, a pumping unit configured to generate a pumping voltage in response to the first or second clock signal, a first detection circuit configured to detect the pumping voltage and generate a first control signal for controlling the operation of the pumping unit based on the result of the detection, and a second detection circuit configured to generate a second control signal for outputting the first or second clock signal generated from the clock generator depending on whether the first control signal maintains an enable state for a specific time.

11 Claims, 5 Drawing Sheets

VOLTAGE GENERATOR AND METHOD OF GENERATING VOLTAGE

CROSS-REFERENCE TO RELATED APPLICATION

Priority is claimed to Korean patent application number 10-2011-0037166 filed on Apr. 21, 2011, the entire disclosure of which is incorporated herein by reference in its entirety.

BACKGROUND

Exemplary embodiments relate generally to an integrated circuit, and more particularly to a voltage generator and a method of generating a voltage for operating a semiconductor memory device.

A semiconductor memory devices such as a flash memory device includes a voltage generator for generating high voltage within a chip. The voltage generator is configured to output high voltage by pumping low voltage through a pumping operation.

The voltage generator includes a plurality of charge pump circuits coupled in series and generates target voltage in such a manner that voltage raised by a charge pump circuit of a previous stage is raised by a charge pump circuit of a next stage in response to an input clock.

A regulator is necessary to maintain the output voltage of the charge pump circuits at a target level. In general, the regulator compares voltage, divided from the output voltage of the charge pump circuit by a resistor, with a reference voltage. If, as a result of the comparison, the output voltage is lower than the reference voltage, the regulator drives the charge pump circuit. If, as a result of the comparison, the divided voltage becomes higher than the reference voltage, the regulator stops the pumping operation of the charge pump circuit.

A known voltage generator performs a pumping operation in response to a clock signal having a constant cycle. Therefore, pump drivability and a pumping voltage rising time may vary depending on the load.

BRIEF SUMMARY

Exemplary embodiments relate to a voltage generator and a method of generating a voltage, which can reduce current consumption during a pumping operation by changing the cycle of a clock signal used in the pumping operation according to a difference between an output voltage level and a target level.

A voltage generator according to an embodiment of the present invention includes a clock generator configured to generate a first clock signal and a second clock signal having a longer cycle than the first clock signal, a pumping unit configured to generate a pumping voltage in response to the first or second clock signal, a first detection circuit configured to detect the pumping voltage and generate a first control signal for controlling the operation of the pumping unit based on the result of the detection, and a second detection circuit configured to generate a second control signal for outputting the first or second clock signal to be generated from the clock generator depending on whether the first control signal maintains an enable state for a specific time.

A method of generating a voltage according to an embodiment of the present invention includes performing a pumping operation in response to a first clock signal so that the pumping voltage rises to a target voltage in an initial pumping operation, stopping the pumping operation when the pumping voltage rises to the target voltage, and performing the pumping operation until the pumping voltage reaches the target voltage in response to the first clock signal when the pumping voltage is lower than the target voltage for a specific time or more and performing the pumping operation until the pumping voltage reaches the target voltage in response to a second clock signal when the pumping voltage is lower than the target voltage for less than the specific time, wherein a cycle of the second clock signal is longer than a cycle of the first clock signal.

DESCRIPTION OF EMBODIMENTS

Hereinafter, some exemplary embodiments of the present disclosure will be described in detail with reference to the accompanying drawings. The figures are provided to allow those having ordinary skill in the art to understand the scope of the embodiments of the disclosure.

Throughout this specification and the claims that follow, when it is described that one part is 'coupled (or connected)' to the other part, it means that the one part may be 'directly coupled (or connected)' to the other part or may be 'electrically coupled (or connected)' to the other part with a third part intervened therebetween.

Throughout this specification and the claims that follow, when it is said that one part 'includes (or comprises)' the other part, it means the one part may further include other parts unless otherwise described without excluding other parts. Furthermore, the term ' . . . unit' described in the specification means a unit for processing at least one function or operation, and the unit may be implemented by hardware or software or a combination of hardware and software.

Figure 1:
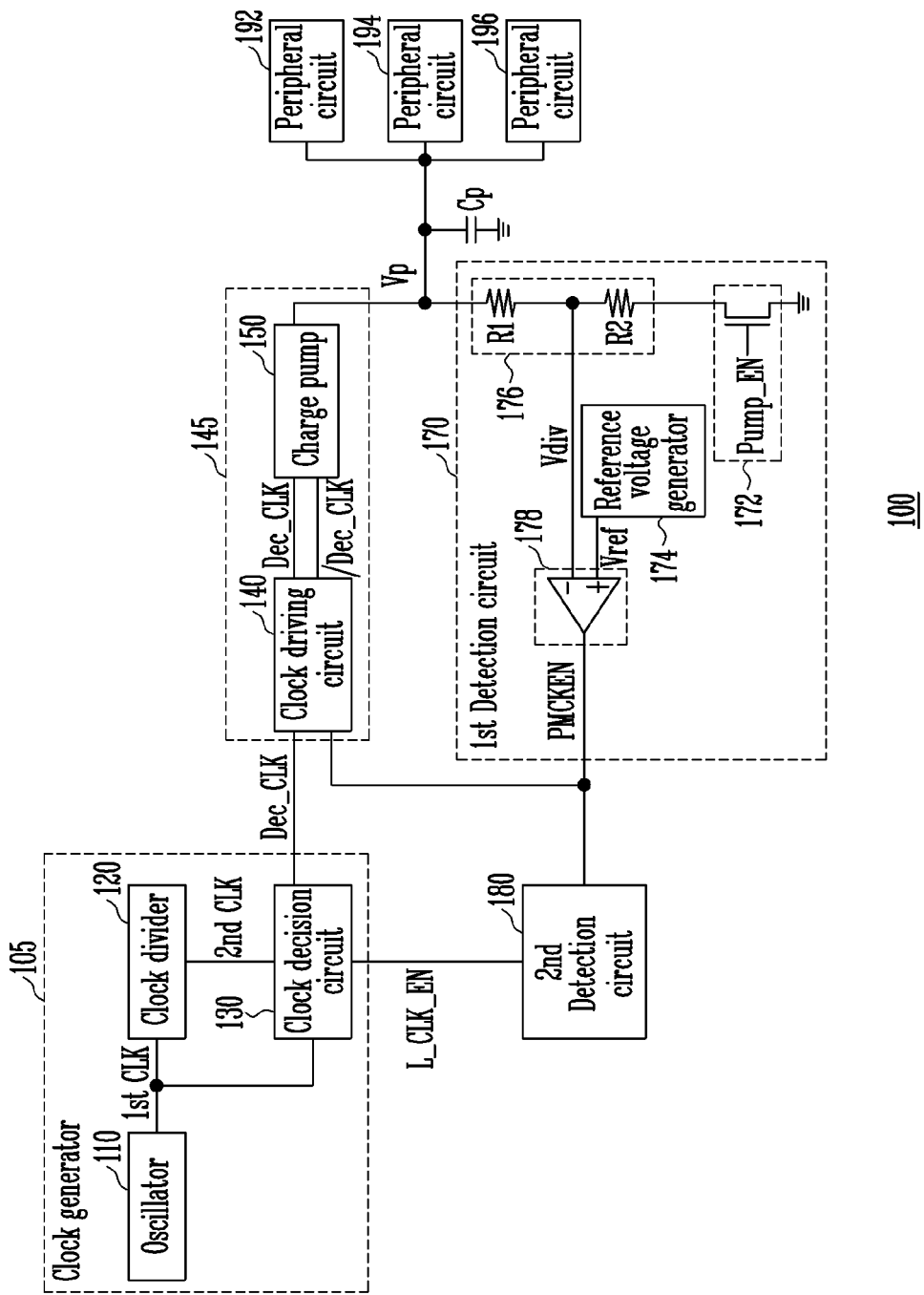
FIG. 1 is a block diagram of a voltage generator according to an embodiment of the present invention.

FIG. 1 is a block diagram of a voltage generator 100 according to an embodiment of the present invention.

Referring to FIG. 1, the voltage generator 100 according to an embodiment of the present invention includes a clock generator 105, a pumping unit 145, a first detection circuit 170 and a second detection circuit 180.

The clock generator 105 is configured to generate a first clock signal $1^{st}$ CLK and a second clock signal $2^{nd}$ CLK having a longer cycle than the first clock signal $1^{st}$ CLK.

The clock generator 105 includes an oscillator 110, a clock divider 120 and a clock decision circuit 130.

The oscillator 110 generates the first clock signal $1^{st}$ CLK that is a reference clock signal necessary for a pumping operation.

The clock divider 120 generates the second clock signal $2^{nd}$ CLK having a longer cycle than the first clock signal $1^{st}$ CLK by dividing the first clock signal $1^{st}$ CLK generated from the oscillator 110. In an embodiment of the present invention, the clock divider 120 may divide the first clock signal $1^{st}$ CLK so that the cycle of the second clock signal $2^{nd}$ CLK is twice as long as the cycle of the first clock signal $1^{st}$ CLK.

The clock decision circuit 130 selects one of the first clock signal $1^{st}$ CLK and the second clock signal $2^{nd}$ CLK in response to a second control signal L_CLK_EN and outputs the selected clock signal as a clock signal Dec_CLK.

The pumping unit 145 generates a target pumping voltage Vp raised from a low input voltage (e.g., a power source voltage) by performing a pumping operation in response to a first control signal PMCKEN and the clock signal Dec_CLK outputted from the clock decision circuit 130.

The pumping unit 145 includes a clock driving circuit 140 and a charge pump 150.

The clock signal Dec_CLK outputted from the clock decision circuit 130 is inputted to the clock driving circuit 140 of the pumping unit 145. The clock driving circuit 140 transfers the clock signal Dec_CLK to the charge pump 150 in response to the first control signal PMCKEN generated at the first detection circuit 170. That is, when the first control signal PMCKEN of a high level is received, the clock driving circuit 140 supplies the clock signal Dec_CLK to the charge pump 150 so that the pumping unit 145 performs the pumping operation. More specifically, the clock driving circuit 140 supplies two clock signals Dec_CLK and /Dec_CLK, having opposite levels to each other, to the charge pump 150.

The first detection circuit 170 detects the pumping voltage Vp and generates the first control signal PMCKEN for controlling the operation of the pumping unit 145 according to the result of the detection.

The first detection circuit 170 includes a voltage generator driver 172, a reference voltage generator 174, a voltage divider 176 and a comparator 178.

The voltage generator driver 172 decides whether to drive the voltage generator 100 in response to a pump enable signal Pump_EN.

The reference voltage generator 174 generates a reference voltage Vref.

The voltage divider 176 generates a divided voltage Vdiv by dividing the pumping voltage Vp generated by the pumping unit 145. The voltage divider 176 may include resistors R1 and R2 which are coupled in series between a ground terminal and the output terminal of the pumping unit 145. The voltage divider 176 may determine a level of the divided voltage Vdiv according to a ratio of resistances of the resistors R1 and R2. Here, one or more of the resistors R1 and R2 may be variable resistors.

The comparator 178 compares the divided voltage Vdiv and the reference voltage Vref and generates the first control signal PMCKEN according to the result of the comparison.

When the pump enable signal Pump_EN is received, the first detection circuit 170 compares the reference voltage Vref and the divided voltage Vdiv at the comparator 178. If, as a result of the comparison, the pumping voltage Vp is lower than a target voltage, the first detection circuit 170 generates the first control signal PMCKEN of a high level. If, as a result of the comparison, the pumping voltage Vp is higher than a target voltage, the first detection circuit 170 generates the first control signal PMCKEN of a low level. When the first control signal PMCKEN of a high level, the pumping unit 145 starts the pumping operation.

The second detection circuit 180 generates the second control signal L_CLK_EN for enabling the first or second clock signal $1^{st}$ CLK or $2^{nd}$ CLK to be outputted from the clock generator 105 depending on whether the first control signal PMCKEN maintains an enable state for a specific time 3T. In other words, the specific time 3T may be a reference period for determining which clock is to be used at the charge pump 150. Here, the 'T' may be a clock cycle or a pulse cycle. More specifically, when the first control signal PMCKEN maintains an enable state for a specific time, the second detection circuit 180 generates the second control signal L_CLK_EN for enabling the first clock signal $1^{st}$ CLK to be outputted from the clock generator 105. When the first control signal PMCKEN does not maintain an enable state for a specific time, the second detection circuit 180 generates the second control signal L_CLK_EN for enabling the second clock signal $2^{nd}$ CLK to be outputted from the clock generator 105.

The first control signal PMCKEN of a high level and the second control signal L_CLK_EN of a high level may be generated at the same time, or only the first control signal PMCKEN of a high level may be generated. In an embodiment of the present invention, the first control signal PMCKEN of a low level and the second control signal L_CLK_EN of a low level may be generated at the same time. If the pumping voltage Vp is higher than a target voltage, the first control signal PMCKEN of a low level and the second control signal L_CLK_EN of a low level are generated, and the pumping operation of the voltage generator 100 is stopped.

The configuration and operation of the second detection circuit 180 will be described in more detail later with reference to FIG. 4.

A capacitor Cp coupled between the output terminal of the pumping unit 145 and the ground terminal is a load capacitor. The load capacitor Cp functions to temporarily store an output voltage.

The pumping voltage Vp generated from the pumping unit 145 is supplied to peripheral circuits 192, 194 and 196.

Figure 2:
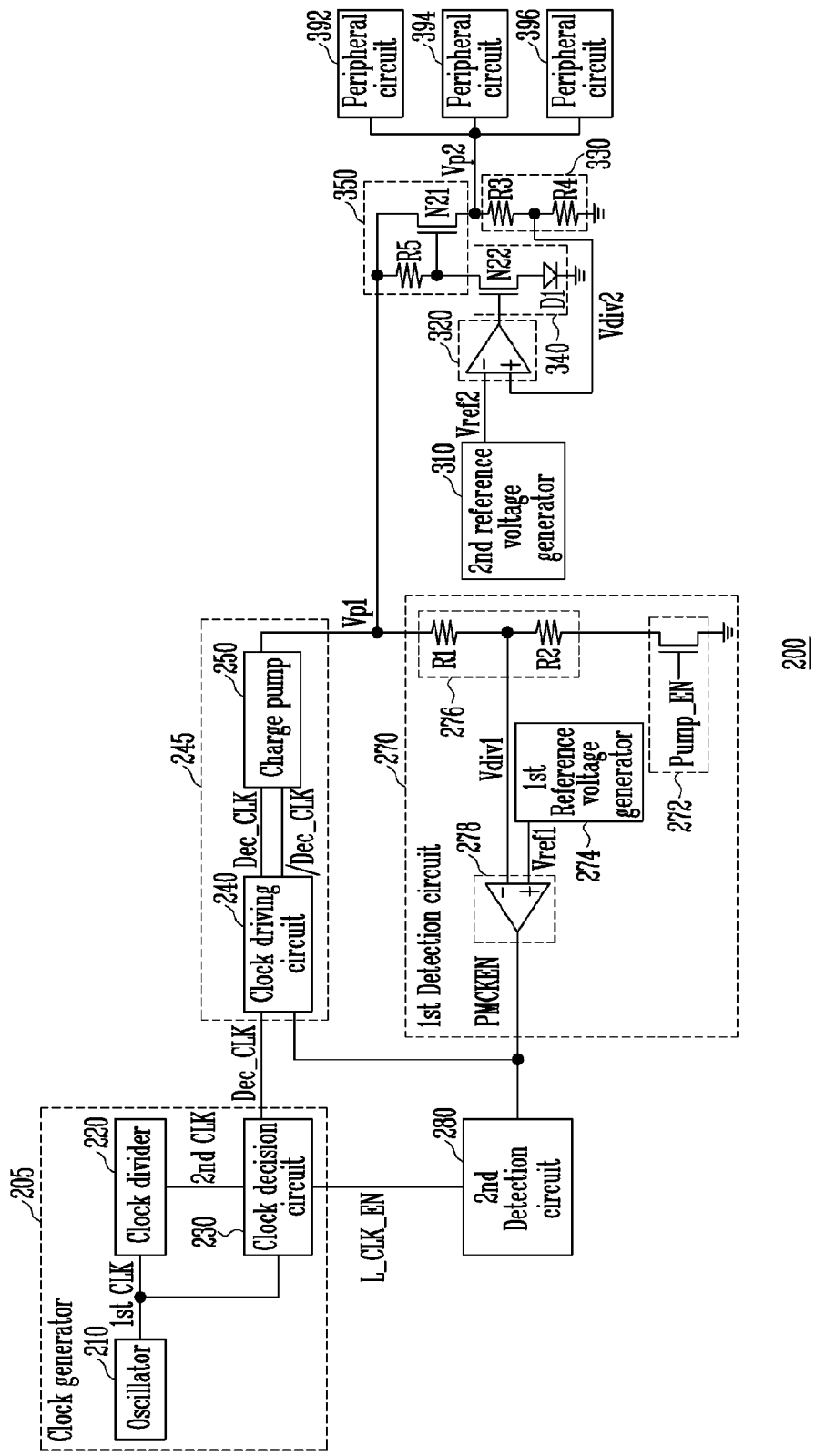
FIG. 2 is a block diagram of a voltage generator according to an embodiment of the present invention.

FIG. 2 is a block diagram of a voltage generator according to an embodiment of the present invention.

Referring to FIG. 2, the voltage generator 200 according to an embodiment of the present invention may include all the elements of the voltage generator 100 described above. Further, the voltage generator 200 according to an embodiment of the present invention includes a second regulation operation circuit in order to perform a regulation operation in two steps.

The second regulation operation circuit converts a regulated pumping voltage (i.e., a first regulation voltage Vp1) into voltage of a specific level and outputs the converted voltage as a second regulation voltage Vp2.

The second regulation operation circuit includes a second reference voltage generator 310, a second comparator 320, a second voltage divider 330, a current cut-off unit 340 and a voltage supply unit 350.

The second voltage divider 330 includes a plurality of resistors R3 and R4 coupled in series and generates a second divided voltage Vdiv2 by dividing the second regulation voltage Vp2 according to a ratio of resistances of the resistors R3 and R4. Here, one or more of the resistors R1 and R2 may be variable resistors. The second voltage divider 330 may include third and fourth resistors R3 and R4 coupled in series between a ground terminal and the output terminal of the voltage supply unit 350. The second voltage divider 330 generates the second divided voltage Vdiv2 according to a ratio of resistances of the resistors R3 and R4 and the second divided voltage Vdiv2 is inputted to the second comparator 320. Here, the output voltage Vp2 is controlled by controlling the resistance of the third resistor R3 (i.e., the third resistor R3 may be a variable resistor).

The second comparator 320 controls the operation of the current cut-off unit 340 by comparing the second divided voltage Vdiv2 and a second reference voltage Vref2. In an embodiment of the present invention, the second comparator 320 includes an OP amplifier having an inverting terminal − for receiving the second reference voltage Vref2 and a non-inverting terminal + for receiving the second divided voltage Vdiv2. Here, the second comparator 320 compares the second divided voltage Vdiv2 and the second reference voltage Vref2. If, as a result of the comparison, the second divided voltage Vdiv2 is higher than the second reference voltage Vref2, the second comparator 320 outputs a signal of a high level. If, as a result of the comparison, the second divided voltage Vdiv2 is lower than the second reference voltage Vref2, the second comparator 320 outputs a signal of a low level.

The current cut-off unit 340 forms a current path ranging from the output terminal of the pumping unit 245 to the ground terminal. In an embodiment of the present invention, the current cut-off unit 340 includes an NMOS transistor N22 turned on in response to a signal outputted from the second comparator 320. The NMOS transistor N22 is coupled between the voltage supply unit 350 and the ground terminal and is turned on in response to a signal of a high level, so that a current path is formed from the output terminal of the pumping unit 245 to the ground terminal. A diode D1 for preventing a counter current may be further included between the NMOS transistor N22 and the ground terminal.

If, as the result of the comparison, the second divided voltage Vdiv2 is higher than the second reference voltage Vref2, the second comparator 320 outputs a signal of a high level, and thus a current path is formed by the current cut-off unit 340. The amount of current flowing through the formed current path is increased as the second divided voltage Vdiv2 becomes higher than the second reference voltage Vref2. Furthermore, when the current path is formed, the first regulation voltage Vp1 is lowered. If the second divided voltage Vdiv2 is lower than the second reference voltage Vref2, the second comparator 320 outputs a signal of a low level. Thus, the NMOS transistor N22 is turned off and the current path is cut off.

The voltage supply unit 350 supplies the first regulation voltage Vp1, through the NMOS transistor N21, to the output terminal of the second regulation operation circuit or cuts off the supply of the first regulation voltage Vp1 to the output terminal of the second regulation operation circuit depending on whether the current path is formed through the NMOS transistor N22. In an embodiment of the present invention, the voltage supply unit 350 includes a resistor R5 and an NMOS transistor N21. The resistor R5 is coupled between the output terminal of the pumping unit 245 and the current cut-off unit 340. The NMOS transistor N21 is coupled between the output terminal of the pumping unit 245 and the second voltage divider 330. Here, voltage at the node between the resistor R5 and the current cut-off unit 340 is supplied to the gate of the NMOS transistor N21.

If the current path is not formed, the first regulation voltage Vp1 is supplied to the gate of the NMOS transistor N21, and thus the NMOS transistor N21 is turned on. Accordingly, the first regulation voltage Vp1 is supplied to the output terminal of the second regulation operation circuit. If the current path is formed, however, the NMOS transistor N21 is not turned on because the level of voltage supplied to the gate of the NMOS transistor N21 is low. Thus, the first regulation voltage Vp1 is not supplied to the output terminal of the second regulation operation circuit.

In accordance with the voltage generator 200 according to an embodiment of the present invention, accurately regulated (i.e., stabilized) voltage can be obtained.

Figure 3:
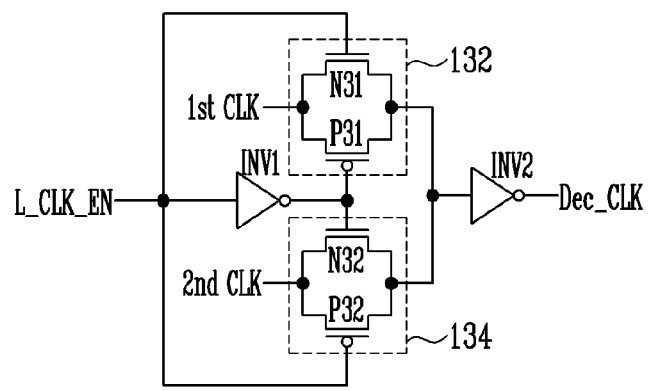
FIG. 3 is a circuit diagram showing a detailed configuration of a clock decision circuit shown in FIG. 1.

FIG. 3 is a circuit diagram showing a detailed configuration of the clock decision circuit shown 130 in FIG. 1.

Referring to FIG. 3, the clock decision circuit 130 includes a first switching unit 132 and a second switching unit 134.

The first switching unit 132 is coupled to the oscillator 110 and is configured to transfer a first clock signal $1^{st}$ CLK, generated from the oscillator 110, in response to the second control signal L_CLK_EN. The first switching unit 132 may be implemented using an NMOS transistor N31 and a PMOS transistor P31. Here, a drain of the NMOS transistor N31 is coupled to a source of the PMOS transistor P31 and a source of the NMOS transistor N31 is coupled to a drain of the PMOS transistor P31.

The second switching unit 134 is coupled to the clock divider 120 and is configured to transfer a second clock signal $2^{nd}$ CLK, generated from the clock divider 120, in response to the second control signal L_CLK_EN. The second switching unit 134 may be implemented using an NMOS transistor N32 and a PMOS transistor P32. Here, a drain of the NMOS transistor N32 is coupled to a source of the PMOS transistor P32 and a source of the NMOS transistor N32 is coupled to a drain of the PMOS transistor P32.

When the second control signal L_CLK_EN of a high level is received, the NMOS transistor N31 and the PMOS transistor P31 of the first switching unit 132 are turned on, and the NMOS transistor N32 and the PMOS transistor P32 of the second switching unit 134 are turned off. Thus, the clock decision circuit 130 outputs the first clock signal $2^{nd}$ CLK as the clock signal Dec_CLK.

When the second control signal L_CLK_EN of a low level is received, the NMOS transistor N31 and the PMOS transistor P31 of the first switching unit 132 are turned off, and the NMOS transistor N32 and the PMOS transistor P32 of the second switching unit 134 are turned on. Thus, the clock decision circuit 130 outputs the second clock signal $2^{nd}$ CLK as the decided clock signal Dec_CLK.

Figure 4:
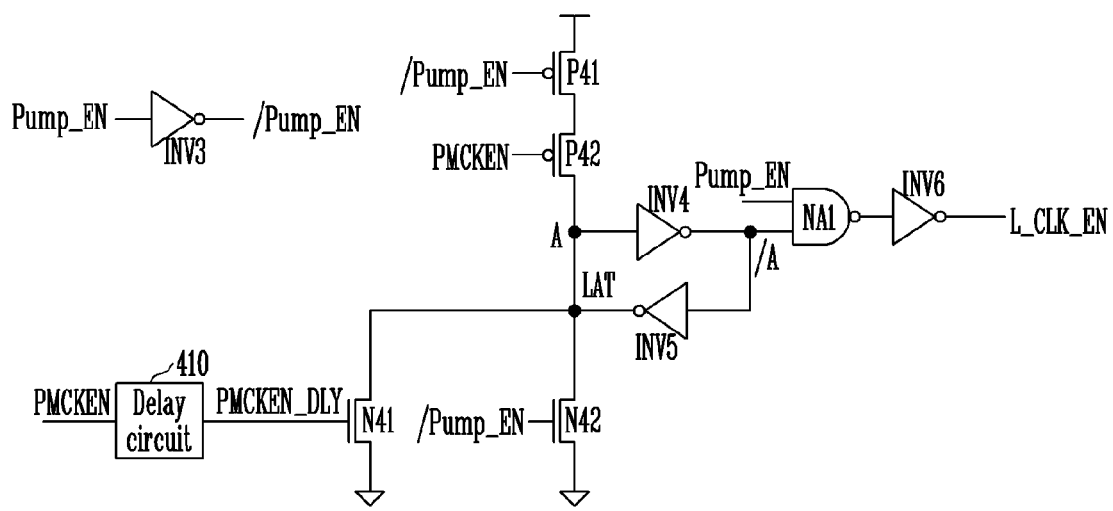
FIG. 4 is a circuit diagram showing a detailed configuration of a second detection circuit shown in FIG. 1.

FIG. 4 is a circuit diagram showing a detailed configuration of the second detection circuit 180 shown in FIG. 1.

Referring to FIG. 4, the second detection circuit 180 generates the second control signal L_CLK_EN in response to the pump enable signal Pump_EN and the first control signal PMCKEN. More specifically, the second detection circuit 180 generates the second control signal L_CLK_EN of a high level when the first control signal PMCKEN of a high level is received for a specific time (e.g., 3T) or more.

The second detection circuit 180 includes first through fourth switching elements P41, P42, N41 and N42, a latch LAT, a delay circuit 410 and logical conjunction elements NA1 and INV6. The first switching element P41 is coupled to a power source voltage terminal and operated in response to a pump enable inverting signal /Pump_EN and the second switching element P42 is coupled to the first switching element P41 and operated in response to the first control signal PMCKEN. The latch LAT is configured to have an input terminal A coupled to the second switching element P42. The third switching element N42 is coupled between the ground terminal and the input terminal A of the latch LAT and configured to operate in response to the pump enable inverting signal /Pump_EN. The delay circuit 410 is configured to delay, for example, only the rising edge of the first control signal PMCKEN by a specific time (e.g., 3T) The fourth switching element N41 is coupled between the ground terminal and the input terminal A of the latch LAT and operated in response to the first enable delay signal PMCKEN_DLY of the delay circuit 410. The logical conjunction elements (e.g., a NAND gate NA1 and an inverter INV6) configured to output the second control signal L_CLK_EN in response to the pump enable signal Pump_EN and data stored in the latch LAT. The pump enable inverting signal /Pump_EN inputted to the first switching element P41 may be delayed by an even number of inverters (not shown) for a specific time and then supplied to the first switching element P41 in order to improve an operational margin.

The first and the second switching elements P41 and P42 may be implemented using PMOS transistors, and the third and the fourth switching elements N42 and N41 may be implemented using NMOS transistors. The latch LAT may be implemented using inverters INV4 and INV5.

Figure 5:
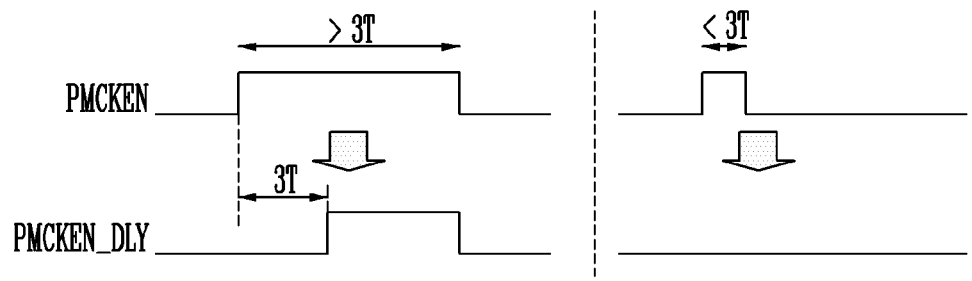
FIG. 5 is a waveform illustrating the operation of the second detection circuit shown in FIG. 4.

FIG. 5 is a waveform illustrating the operation of the second detection circuit 180 shown in FIG. 4.

Referring to FIGS. 4 and 5, at the initial stage, the pump enable signal Pump_EN is in a high level and the first control signal PMCKEN is in a low level. Thus, the first switching element P41 and the second switching element P42 are turned on in response to the pump enable inverting signal /Pump_EN and the first control signal PMCKEN, respectively. Consequently, the latch LAT stores data of a low level in the node A. The second detection circuit 180 generates the second control signal L_CLK_EN of a low level in response to the data of a high level, stored in the latch LAT, and the pump enable signal Pump_EN of a high level inputted to the logical conjunction elements NA1 and INV6.

Next, when a pumping operation is started, the first detection circuit 170 generates the first control signal PMCKEN of a high level. In this case, the delay circuit 410 outputs the first enable delay signal PMCKEN_DLY which has a rising edge delayed from that of the first control signal PMCKEN by a specific time 3T and has a falling edge identical with that of the first control signal PMCKEN. In response to the first enable delay signal PMCKEN_DLY, the fourth switching element N41 is turned on, the node A of the latch LAT changes to a low level, thus data stored in the latch LAT is changed to a high level. The second detection circuit 180 generates the second control signal L_CLK_EN of a high level in response to data of a high level, stored in the latch LAT, and the pump enable signal Pump_EN of a high level inputted to the logical conjunction elements NA1 and INV6.

As described above, at the stage of the pumping operation, in order to generate the pumping voltage Vp having a target voltage within a short time, the second control signal L_CLK_EN of a high level is generated in response to the first clock signal so that the pumping operation is performed.

After the pumping voltage Vp reaches the target voltage, the first control signal PMCKEN shifts to a low level and thus the second control signal L_CLK_EN also shifts to a low level.

If the pumping voltage Vp becomes lower than the target voltage owing to leakage or the operation of the peripheral circuits, however, the level of the second control signal L_CLK_EN is determined based on the first control signal PMCKEN. This is described in more detail below.

If the pumping voltage Vp becomes lower than the target voltage after the pumping voltage Vp reaches the target voltage, the first control signal PMCKEN first shifts to a high level in order to perform a pumping operation.

Here, if the pumping voltage Vp becomes very lower than the target voltage such that the pumping voltage Vp is lower than a predetermined value, e.g., if a difference between the pumping voltage Vp and the target voltage is greater than a set value, the first control signal PMCKEN of a high level is supplied for a specific time (e.g., 3T) or more. Thus, the second control signal L_CLK_EN shifts to a high level after the specific time 3T since the first control signal PMCKEN shifts to a high level.

If the pumping voltage Vp becomes lower than the target voltage as described above, both the first control signal PMCKEN and the second control signal L_CLK_EN shift to a high level, and thus the first clock signal is selected by the clock decision circuit 130. Accordingly, the pumping voltage Vp can be rapidly raised to the target voltage by performing the pumping operation in response to the first clock signal.

If the pumping voltage Vp becomes slightly lower than the target voltage such that such that the pumping voltage Vp is higher than a predetermined value, e.g., if a difference between the pumping voltage Vp and the target voltage is smaller than a set value, however, the first control signal PMCKEN of a high level is supplied in a form shorter than the specific time 3T (i.e., a pulse form). In other words, a pulse width of the first control signal PMCKEN is shorter than the specific time 3T. In this case, the first control signal PMCKEN_DLY continues to maintain a low level because the delay circuit 410 delays the rising edge of the first control signal PMCKEN by the specific time 3T. Accordingly, the signal stored in the latch LAT is retained, and the second control signal L_CLK_EN continues to maintain a low level.

If the pumping voltage Vp becomes slight lower than the target voltage as described above, only the first control signal PMCKEN shifts to a high level, the clock decision circuit 130 decides the second clock signal, and thus a pumping operation is performed in response to the second clock signal having a longer cycle than the first clock signal. Accordingly, the pumping voltage Vp is raised to the target voltage, but a difference between the pumping voltage Vp and the target voltage can be minimized.

Figure 6:
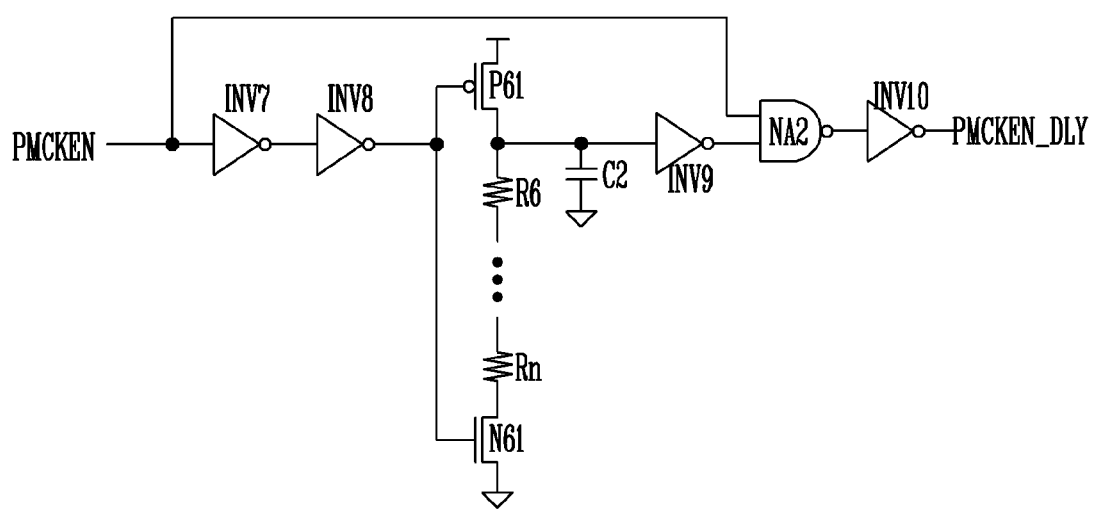
FIG. 6 is a circuit diagram showing a detailed configuration of a delay circuit shown in FIG. 4.

FIG. 6 is a circuit diagram showing a detailed configuration of the delay circuit 410 shown in FIG. 4.

Referring to FIG. 6, the delay circuit 410 includes a plurality of inverters INV7 to INV10, a PMOS transistor P61, an NMOS transistor N61, a plurality of resistors R6 to Rn, a capacitor C2 and a logic gate NA2.

The PMOS transistor P61 and the NMOS transistor N61 are coupled in series between the power source terminal and the ground terminal. The plurality of resistors R6 to Rn is coupled in series between the PMOS transistor P61 and the NMOS transistor N61. The gate of the PMOS transistor P61 and the gate of the NMOS transistor N61 are coupled to each other. The first control signal PMCKEN (i.e., an input signal of the delay circuit 410) is inputted to the gates of the PMOS transistor P61 and the NMOS transistor N61 via the two inverters INV7 and INV8 which are coupled in series.

The capacitor C2 and the inverter INV9 are coupled in parallel between the PMOS transistor P61 and the resistors R6 to Rn. The other terminal of the capacitor C2 is coupled to the ground terminal.

The output signal of the inverter INV9 and the first control signal PMCKEN (i.e., the input signal of the delay circuit 410) are supplied to the input terminal of the logic gate NA2. The first enable delay signal PMCKEN_DLY delayed through the inverter INV10 is outputted.

The operation of the delay circuit 410 is described below.

First, when the first control signal PMCKEN of a low level is received, the first control signal PMCKEN is inverted by the two inverters INV7 and INV8, and thus a signal of a low level is inputted to the gates of the PMOS transistor P61 and the NMOS transistor N61. In response to the signal, the PMOS transistor P61 is turned on, and the NMOS transistor N61 is turned off. Accordingly, the capacitor C2 is charged with a power source voltage (e.g., Vcc). Since the first control signal PMCKEN of a low level is received, the logic gate NA2 outputs a signal of a high level irrespective of the signal of another input terminal without delay at the inverters INV7 and INV8, the PMOS transistor P61 and the NMOS transistor N61, the capacitor C2 and the inverter INV9. The first enable delay signal PMCKEN_DLY of a low level, inverted by the inverter INV10, is outputted.

Next, when the first control signal PMCKEN of a high level is received, the first control signal PMCKEN is inverted by the two inverters INV7 and INV8, and thus a signal of a high level is inputted to the gates of the PMOS transistor P61 and the NMOS transistor N61. In response to the signal, the PMOS transistor P61 is turned off, and the NMOS transistor N61 is turned on. Accordingly, a current path is formed through the capacitor C2, the resistors R6 to Rn and the NMOS transistor N61. Charges are discharged from the capacitor C2 through the current path. When the signal of a high level shifts to a sufficiently low level after a lapse of a specific time, the signal of a low level is inverted by the inverter INV9, and thus the signal of a high level is supplied to the logic gate NA2. Here, the plurality of resistors R6 to Rn coupled in series determines the time taken for the signal to be delayed by the delay circuit 410. The delay time may be adjusted by controlling the resistances of the resistors R6 to Rn. In an embodiment of the present invention, the delay time of 3T is described as an example.

When the first control signal PMCKEN of a high level and the signal of a high level inverted by the inverter INV9 are supplied to the logic gate NA2, the logic gate NA2 outputs a signal of a low level. The inverter INV10 outputs the first enable delay signal PMCKEN_DLY of a high level by inverting the signal of a low level. The first enable delay signal PMCKEN_DLY is a signal delayed by the delay circuit 410.

That is, the delay circuit 410 outputs a signal, having the rising edge of the first control signal PMCKEN delayed, but the falling edge thereof not delayed, as the first enable delay signal PMCKEN_DLY.

The operation of the voltage generator according to an embodiment of the present invention is described with reference to FIG. 7.

Figure 7:
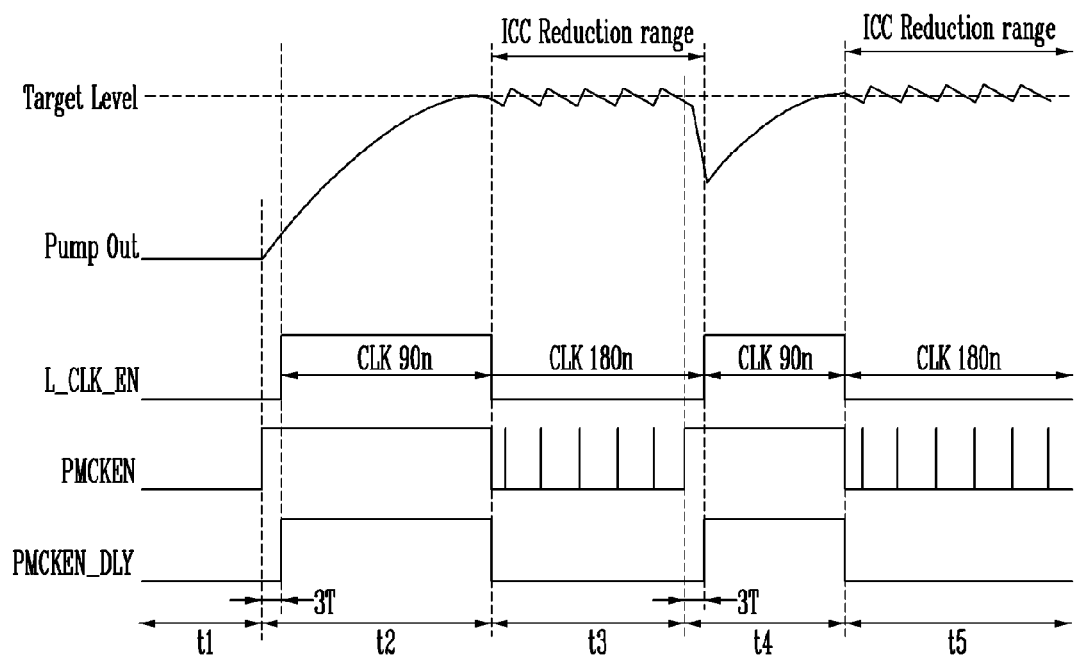
FIG. 7 is a waveform illustrating the operation of the voltage generator according to an embodiment of the present invention.

FIG. 7 is a timing diagram illustrating the operation of the voltage generator according to an embodiment of the present invention.

Referring to FIGS. 1 and 7, in a pre-initial section t1 before a pumping operation is performed, both the first control signal PMCKEN and the second control signal L_CLK_EN are in a low level, and the pumping operation is not performed.

At this time, a reset operation is performed in the second detection circuit 180, and thus data of a low level is stored in the latch (LAT of FIG. 4).

In a pumping section t2, both the first control signal PMCKEN and the second control signal L_CLK_EN shift to a high level, and thus the pumping operation is performed in response to the first clock signal. As a result, the pumping voltage Vp rapidly rises to a target voltage.

In a stabilization section t3, when the pumping voltage Vp becomes lower than the target voltage after rising to the target voltage, the first detection circuit 170 detects this decrease and generates the first control signal PMCKEN of a high level. Here, since the decrease of the pumping voltage Vp from the target voltage is small, the pumping voltage Vp rises to the target voltage before the first control signal PMCKEN maintains a high level for the specific time 3T or more. Accordingly, the first control signal PMCKEN changes to a low level again and the second control signal L_CLK_EN continues to maintain a low level. As a result, the second clock signal is decided by the clock decision circuit 130, and the pumping voltage Vp is raised by a pumping operation performed in response to the second clock signal. In this case, the pumping voltage Vp does not become higher than the case where the pumping operation is performed in response to the first clock signal.

As described above, in the stabilization section t3, when the pumping voltage Vp becomes lower than the target voltage, the first control signal PMCKEN shifts to a high level and the second control signal L_CLK_EN shifts to a low level. Accordingly, the pumping operation is performed in response to the second clock signal.

In a peripheral circuit operation section t4, when the peripheral circuits 192 to 196 suddenly start operating, the pumping voltage Vp sharply becomes very lower than the target voltage. If a pump load is sharply increased as described above, the first control signal PMCKEN shifts to a high level and maintains a high level for the specific time 3T or more. Accordingly, the second detection circuit 180 generates the second control signal L_CLK_EN of a high level in response to the first control signal PMCKEN of a high level which is maintained for the specific time 3T or more. In other words, when the first control signal PMCKEN shifts to a high level and the specific time 3T elapses, the delayed first control signal PMCKEN_DLY shifts to a high level, so the second detection circuit 180 generates the second control signal L_CLK_EN of a high level. As a result, the first clock signal is selected by the clock decision circuit 130, and a pumping operation is performed in response to the first clock signal.

If, as described above, the pumping voltage Vp sharply decreases to a voltage level much lower than the target voltage because a pump load is sharply increased, the pumping operation is performed in response to the first clock signal having a short clock cycle in order to rapidly raise the pumping voltage Vp to the target voltage.

In a stabilization section t5, when the pumping voltage Vp rises to the target voltage, the operation of the pumping unit 145 is suspended again. Furthermore, the pumping operation is performed again in response to the second clock signal when the pumping voltage Vp becomes slightly lower than the target voltage owing to a reason, such as leakage, in order to maintain the pumping voltage Vp to the target voltage.

Likewise, when the pumping voltage Vp sharply increases to a voltage level much higher than the target voltage, the pumping operation is performed in response to the first clock signal as in the peripheral circuit operation section t4.

As described above, the voltage generator in an embodiment of the present invention can maintain the pumping voltage Vp to the target voltage and rapidly raise the pumping voltage Vp to the target voltage when the pumping voltage Vp becomes very low.

In an embodiment of the present invention, '3T' may refer to the time that distinguishes the period where voltage is stabilized and the period where voltage is raised from each other while a pump is regulated. That is, 3T refers to the time that is determined with consideration taken of a maximum time of the first control signal PMCKEN shortly enabled in a pulse form in the stabilized period. In an embodiment of the present invention, '3T' may refer to a maximum pulse width of the first control signal PMCKEN in the case where the delayed first control signal PMCKEN_DLY is disabled.

In an embodiment of the present invention, in the voltage rising period where the first control signal PMCKEN is enabled for the time longer than 3T, the pumping operation is performed by using a first clock signal having a basis clock cycle. In the voltage stabilization period where the first control signal PMCKEN is enabled for the time shorter than 3T, the pumping operation is performed by using a second clock signal doubly divided from the basis clock cycle.

That is, as the cycle of the clock signal is reduced, pump drivability is increased, but current consumption of the pump is increased. For this reason, the cycle of the clock signal is reduced in a period where a load is great and the cycle of the clock signal is increased in a period where a load is small in order to reduce current consumption of the pump.

According to an embodiment of the present invention, in an initial pumping operation of the voltage generator, output voltage is raised by performing a pumping operation using the first clock signal. If the output voltage is slightly lowered after the output voltage reaches a target voltage, the pumping operation is performed by using the second clock signal having a longer cycle than the first clock signal. If the output voltage is greatly lowered owing to sharply increasing power consumption, the pumping operation is performed by using the first clock signal. Accordingly, current consumption occurring when a pumping operation is performed can be reduced, and current consumption of a chip can be significantly reduced.

The above exemplary embodiments of this disclosure are not implemented by only a method and an apparatus, but may be implemented using a program for realizing a function corresponding to the construction of the exemplary embodiment of this disclosure or a recording medium on which the program is recorded. The implementation can be easily achieved by those having ordinary skill in the art to which this disclosure pertains from the above exemplary embodiment.

What is claimed is:

1. A voltage generator, comprising:
   a clock generator configured to generate a first clock signal and a second clock signal having a longer cycle than the first clock signal;
   a pumping unit configured to generate a pumping voltage in response to the first or second clock signal;
   a first detection circuit configured to detect the pumping voltage and generate a first control signal for controlling an operation of the pumping unit based on a result of the detection; and
   a second detection circuit configured to generate a second control signal for outputting the first or second clock signal generated from the clock generator depending on whether the first control signal maintains an enable state for a specific time,
   the second detection circuit comprising:
   a first switching element coupled to a power source voltage terminal and configured to operate in response to an inverted signal of a pump enable signal;
   a second switching element coupled to the first switching element and configured to operate in response to the first control signal;
   a latch configured to have an input terminal coupled to the second switching element;
   a first delay circuit configured to delay a rising edge of the first control signal for the specific time;
   a third switching element coupled between a ground terminal and the input terminal of the latch and configured to operate in response to an output signal of the first delay circuit; and
   a logical conjunction element configured to generate the second control signal in response to the pump enable signal and the output signal of the latch.

2. The voltage generator of claim 1, wherein the clock generator comprises:
   an oscillator configured to generate the first clock signal;
   a clock divider configured to generate the second clock signal having a longer cycle than the first clock signal by dividing the first clock signal; and
   a clock decision circuit configured to output the first or second clock signal in response to the second control signal.

3. The voltage generator of claim 1, wherein the pumping unit comprises:
   a charge pump configured to perform a pumping operation in response to the first or second clock signal; and
   a clock driving circuit configured to transfer the first or second clock signal to the charge pump or not to transfer the first or second clock signal to the charge pump in response to the first control signal.

4. The voltage generator of claim 1, wherein the cycle of the second clock signal is twice as long as the cycle of the first clock signal.

5. The voltage generator of claim 1, wherein the first detection circuit comprises:
   a voltage generator driver configured to determine whether to drive the voltage generator in response a pump enable signal;
   a reference voltage generator configured to generate a reference voltage;
   a voltage divider configured to generate a divided voltage by dividing the pumping voltage; and
   a comparator configured to compare the divided voltage with the reference voltage and generate the first control signal based on a result of the comparison.

6. The voltage generator of claim 5, wherein the voltage divider comprises resistors coupled in series between a ground terminal and an output terminal of the pumping unit and generates the divided voltage by dividing the pumping voltage using the resistors.

7. The voltage generator of claim 1, wherein:
   the first detection circuit generates the first control signal of a high level so that the pumping unit performs a pumping operation when the pumping voltage is lower than a target voltage, and
   the first detection circuit generates the first control signal of a low level so that the pumping unit stops the pumping operation when the pumping voltage is higher than the target voltage.

8. The voltage generator of claim 1, wherein:
   the second detection circuit generates the second control signal for outputting the first clock signal generated from the clock generator when the first control signal maintains the enable state for the specific time,
   the second detection circuit generates the second control signal for outputting the second clock signal generated from the clock generator when the first control signal does not maintain the enable state for the specific time.

9. The voltage generator of claim 1, further comprising a second delay circuit for delaying the inverted signal of the pump enable signal supplied to the first switching element.

10. The voltage generator of claim 1, wherein the second delay circuit comprises an even number of inverters coupled in series.

11. The voltage generator of claim 2, wherein the clock decision circuit comprises:
    a first switching unit configured to output the first clock signal in response to the second control signal of a high level; and
    a second switching unit configured to output the second clock signal in response to the second control signal of a low level.

* * * * *